United States Patent [19]

Seino et al.

[11] B  4,014,802

[45] Mar. 29, 1977

[54] OIL-IMPREGNATED SINTERED PRODUCT AND METHOD OF PRODUCING SAME

[75] Inventors: Hiroshi Seino, Yokohama; Norio Yamada, Yokosuka; Shigeo Kimura, Fujisawa; Hideaki Kosugi; Koreyuki Yamamoto, both of Yokosuka, all of Japan

[73] Assignee: Nissan Motor Co., Ltd., Yokohama, Japan

[22] Filed: July 18, 1973

[21] Appl. No.: 380,137

[44] Published under the second Trial Voluntary Protest Program on March 23, 1976 as document No. B 380,137.

[30] Foreign Application Priority Data

July 19, 1972 Japan .............................. 47-71573

[52] U.S. Cl. .............................................. 252/12.2
[51] Int. Cl.² .................. C10M 5/00; F16D 69/00; C10M 7/00
[58] Field of Search ................. 252/12, 12.2, 12.4, 252/12.6

[56] References Cited

UNITED STATES PATENTS 3,305,325  2/1967  Brasse et al. .................... 252/12.2

FOREIGN PATENTS OR APPLICATIONS 45-27210  7/1970  Japan .............................. 252/12.2
714,946   9/1954  United Kingdom ............. 252/12.2

*Primary Examiner*—Delbert E. Gantz
*Assistant Examiner*—I. Vaughn

[57] ABSTRACT

An oil-impregnated sintered product having a resin-impregnated layer on the surface thereof for preventing oil contained therein from scattering therefrom when it moves at high speed. A method of producing the same comprising the steps of forming a seal layer on a sintered product, impregnating the sintered product with thermosetting resin, removing the seal layer, and impregnating the sintered product with oil.

3 Claims, 8 Drawing Figures

OIL-IMPREGNATED SINTERED PRODUCT AND METHOD OF PRODUCING SAME

This invention relates to an improved oil-impregnated sintered product having a resin-impregnated layer on the surface of at least a portion of the product and a method of producing the same.

As is well known, an oil-impregnated sintered product, that is, a sintered product whose pores are impregnated with oil, is extensively used as a wear-resistant or self-lubricating part because of its ability to provide durable lubrication. In cases where the oil-impregnated sintered product is moved at high speed, the oil contained therein tends to scatter externally therefrom due to inertia or centrifugal force produced by the movement. In this case, oil is mainly scattered from the portions of the surface vertically to or nearly vertically to the direction of the force. Scattering of oil contained in the oil-impregnated sintered product will inevitably result in a shortage of oil in the pores thereof, thereby causing insufficient lubrication. Moreover, the scattered particles of oil may adhere to other parts in the vicinity of the moving oil-impregnated sintered product thereby exerting an undesirable influence on their operation.

Therefore, there arises an urgent need for providing a new oil-impregnated sintered product which can effectively prevent external scattering of oil contained therein to maintain high lubricating ability. For this purpose, it is considered effective for an oil-impregnated sintered product to be provided on its surface with an oil-scattering preventive layer impregnated with a suitable agent.

There is a conventional method which fully impregnates the pores of a sintered product with a metal such as copper at high temperature and high pressure in order to give airtightness and strength to the sintered product. This method, however, is not suitable for producing the above-mentioned oil-scattering preventive layer because it fully impregnates the pores of a sintered product with metal and, therefore, leaves no room for oil-impregnation.

Accordingly, it is an object of the present invention to provide an improved oil-impregnated sintered product which has a high and constant lubricating ability for a long duration, and to provide a simple and effective method of producing the same.

Another object of the present invention is to provide an oil-scattering preventive resin-impregnated-layer on the surface of an oil-impregnated sintered product, and to provide a simple and effective method of producing the same.

According to the present invention and to accomplish these and other objects, there is provided an oil-impregnated sintered product which is to be moved at high speed and subjected to at least a force produce by its movement e.g., an oil-impregnated sintered clutch hub of a clutch disc which comprises an oil-impregnated portion having at least one exposed self-lubricating surface e.g., a splined surface, and a resin-impregnated layer impregnated with resin, preferably thermosetting resin such as diallyl phtalate resin, phenol resin and epoxy resin which covers at least portions of the rest of the surface of the oil-impregnated portion vertically to or nearly vertically to the direction of said force. The resin-impregnated layer thus prevents oil contained in the oil-impregnated portion from scattering externally due to a force produced by movement of the oil-impregnated sintered product.

In further accordance with the present invention, there is provided a method of producing the above-mentioned oil-impregnated sintered product from a sintered product which comprises the step of providing sealing means for preventing formation of the resin-impregnated layer at least on the portion of the surface of the sintered product where the exposed self-lubricating surface is to be formed, e.g., forming a seal layer made of rubber or resin such as urethane resin and polyfluoroethylene resin at least on the portion of the surface of the sintered product where the exposed self-lubricating surface is to be formed, the step of impregnating the rest of the surface of the sintered product with resin, e.g., diallyl phtalate resin, phenol resin and epoxy resin and curing the same thereby to form the resin-impregnated layer, the step of removing the sealing means, e.g., the seal layer, and the step of impregnating an inner portion of sintered product with oil thereby to form the oil-impregnated portion. In this method, the sintered product may be dipped for impregnation in resin, preferably thermosetting resin at a temperature of 15° to 80°C for a period determined by the desired thickness of the resin-impregnated layer to be formed, the pressure may be atmospheric pressure or a vacuum of $1 \times 10^{-3}$ mmHg or more or a positive pressure of about 2.0 kg/cm². The sintered product is then heated and the resin therein is half-cured at a temperature of 90° to 100°C for 1 hour after the sintered product is taken out of the resin bath, and then it is heated at a temperature of 150°C for 1 hour to cured completely the resin impregnated therein.

Other features and advantages of the present invention will become more apparent from the following description given by way of example with reference to the accompanying drawings in which like reference numerals and characters designate corresponding parts throughout the figures and in which.

For the sake of clarity, this invention will be described hereinafter as a clutch hub incorporated into a clutch disc.

Figure 1:
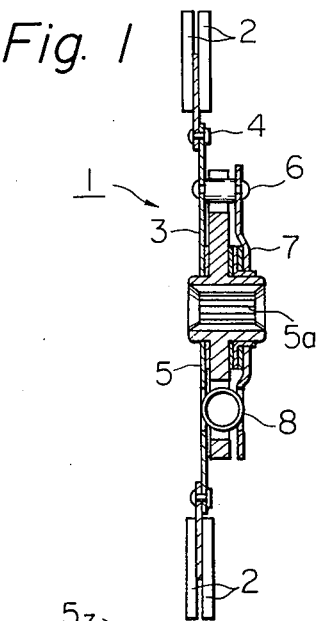
FIG. 1 is a longitudinal sectional view of a clutch disc comprising a preferred embodiment of a clutch hub according to the present invention.

Referring now to the drawings, first to FIG. 1, a clutch disc generally designated as 1 has a pair of clutch faces 2 which are disposed between a fly-wheel (not shown) and a pressure plate (not shown) to transmit power therethrough. The clutch faces 2 are secured to a drive plate 3 by rivets 4. The drive plate 3 is mounted on a clutch hub 5 by stop pins 6 and a slide plate 7 through torsion springs 8. The clutch hub 5 is provided at its center with a splined bore 5a through which a splined clutch shaft (not shown) is axially movable. Accordingly, lubrication is desired between the splined bore 5a and the splined clutch shaft (not shown).

Figure 2:
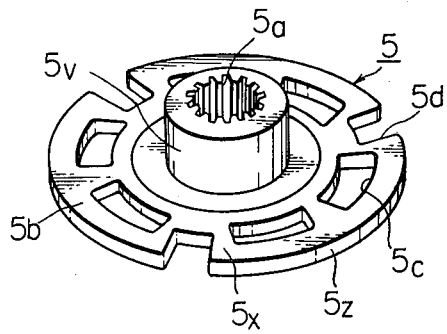
FIG. 2 is a perspective view of the clutch hub shown in FIG. 1.
Figure 3:
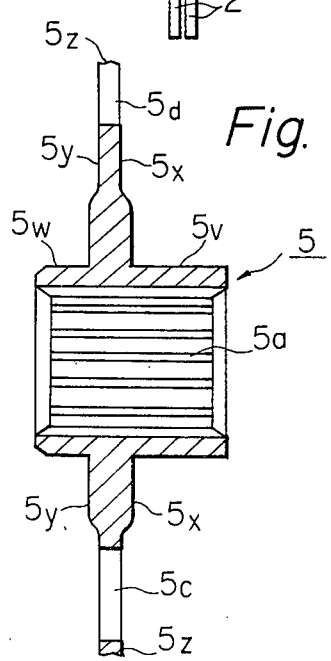
FIG. 3 is an enlarged longitudinal sectional view of the clutch hub shown in FIG. 1.

As shown in FIGS. 2 and 3, the clutch hub 5 is provided with a circular extension 5b having angularly spaced openings 5c for receiving the torsion springs 8 and also with recesses 5d for receiving the stop pins 6. The splined bore 5a is situated in a central cylindrical portion of the hub 5.

preferred embodiments of a clutch hub according to this invention are as follows:

EXAMPLES

Figure 4:
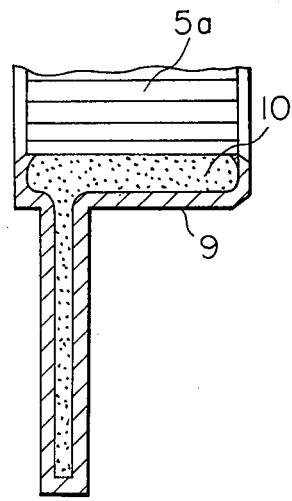
FIG. 4 is an enlarged fragmentary sectional view of the clutch hub shown in FIG. 1, illustrating the arrangement of the oil-impregnated portion and the resin-impregnated layer according to this invention.
Figure 5:
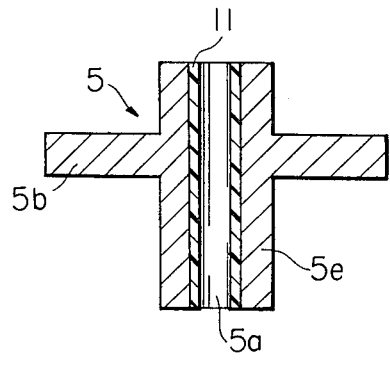
FIGS. 5 to 8 are schematic longitudinal sectional views of the clutch hub illustrating various modifications of splined bore sealing means according to this invention.

A metal powder was compacted and sintered to form a clutch hub as shown in FIGS. 1, 2 and 3. This sintered clutch hub was heat treated and then the surface of the splined bore 5a was sealed with a seal layer 11 (FIG. 5) or other suitable means. The outer surface of the sintered clutch hub other than the sealed portion was then impregnated with a thermosetting resin to form a resin-impregnated layer 9 (FIG. 4) on the portions thereof designated as 5v, 5w, 5x, 5y, and 5z as shown in FIGS. 2 and 3. After the seal layer was removed, the inner portion of the sintered clutch hub was impregnated with oil to form an oil-impregnated portion 10 (FIG. 4). In the oil-impregnated sintered clutch hub thus produced, the resin-impregnated layer was proved to effectively prevent oil contained in the oil-impregnated portion from scattering externally therefrom due to centrifugal force produced by rotation of the clutch hub.

Details and conditions of each step of the above-mentioned process are as follows:

1. Sintering step

| | |
|---|---|
| Powder composition: | Fe 97.3% |
| | Cu 2.0% |
| | C 0.7% |
| Compacting pressure: | 5 t/cm² |
| Sintering conditions: | 1,120°C for 60 minutes |
| Density: | 6.8 g/cm³ |

2. Heat treating step
   Any conditions which are suitable may be adopted. However, the following conditions were adopted in this example:
   Hardening: Oil quenching from 850°C to 60°C
   Annealing: At 150°C 3. Sealing means providing step
   After heat treatment, the sintered clutch hub was cleaned with trichlene and then the surface of the splined bore 5a was covered with a seal layer 11 (FIG. 5) made of rubber or resin such as urethane resin and fluorocarbon resin.

The purpose of this seal layer is to prevent resin-impregnation therethrough into the surface of the splined bore 5a. Therefore, the material of the seal layer is not limited to urethane resin, fluorocarbon resin and rubber, and may be of any material if it is effective in sealing and can be easily removed.

Figure 6:
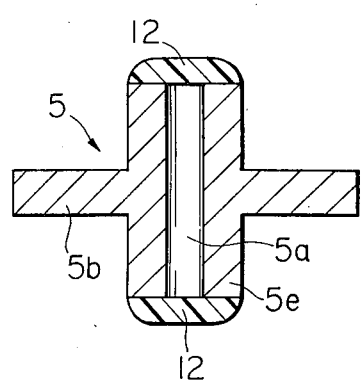

FIG. 6 shows a modification of the sealing means forming step. In this example, both ends of the central cylindrical portion of the hub 5 of the clutch hub 5, i.e., the splined bore 5a were sealed with sealing members 12 made of rubber or resin such as urethane resin and fluorocarbon resin. Thus, the surface of the splined bore 5a was prevented from being resin-impregnated in the following resin-impregnation step.

Figure 7:
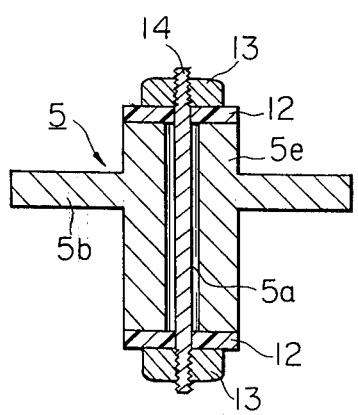
Figure 8:
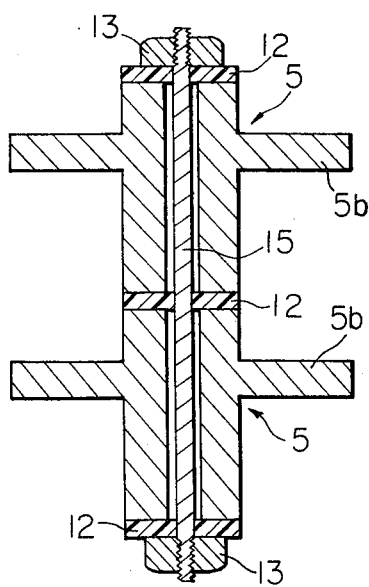

FIG. 7 shows another modification of the sealing means forming step. In this example, the sealing members 12 made of resin, rubber or metal were fixed on both ends of the central cylindrical portion of the hub 5, i.e., the splined bore 5a by bolts 13 and a bolt (or shaft) 14. As shown in FIG. 8, When an elongated shaft 15 is used, a plurality of clutch hubs can be connected in series thereby enabling mass-production.

In the examples shown in FIGS. 6 and 7, the annular end surface of the central cylindrical portion of the hub 5 is not provided with a resin-impregnated layer, since the sealing member 12 is in close contact with the annular end surface. However, there is almost no possibility that oil impregnated in the clutch hub is scattered externally from the annular end surface of the central cylindrical portion of the hub 5 by rotation of the clutch hub, since the annular end surface is parallel with the direction of centrifugal force produced by rotation of the clutch hub 5.

4. Resin-impregnation step
   Resin used: Diallyl phtalate resin
   Resin-impregnation was carried out by one of the following three methods (a), (b) and (c).
   a. Impregnation under atmospheric pressure
      The sintered clutch hub was immersed and held for a period determined by the desired thickness of the resin-impregnated layer in a bath of diallyl phtalate resin at a temperature of 15°C to 80°C under atmospheric pressure. The resin penetrated into the pores of the sintered clutch hub by capillary action. The sintered clutch hub was then taken out of the resin bath and was heated and the resin therein polymerized at 90°C to 100°C for one hour. The clutch hub was then heated at 150°C for 1 hour to set the resin contained in the pores. Thus the resin-impregnated layer was formed.

The reason why the resin was kept at a temperature of 15°C to 80°C is as follows:
      If the resin is kept at a temperature of 15°C or lower, its viscosity will be high and, therefore, a great amount of excess resin will adhere to the surface of the clutch hub when it is taken out of the resin bath thereby increasing the difficulty in controlling the resin-impregnated layer. On the other hand, if the resin is kept at a temperature of 80°C or higher, curing of the resin will proceed in an excessively short period of time and, therefore, the viscosity of the resin will increase too rapidly. This increased viscosity of the resin will result in waste because re-use of the resin becomes impossible.
      The dipping time of the clutch hub is determined by the desired thickness of the resin-impregnated layer. The reason why the clutch hub is held at a temperature of 90°C to 100°C after it was taken out of the resin bath is to prevent the occurrence of cracks in the clutch hub due to a rapid temperature increase.
   b. Impregnation under vacuum
      The clutch hub was dipped and held for a period determined by the desired thickness of the resin-impregnated layer in a bath of diallyl phtalate resin at a temperature of 15°C to 80°C under a vacuum of $1 \times 10^{-3}$ mmHg or less to let the resin penetrate into the pores of the sintered clutch hub. After atmospheric pressure was restored, the clutch hub was further held at the same temperature in the resin bath for at least ten minutes to obtain a desired stable resin-impregnated layer. Then it was taken out of the resin bath and was heated and the resin therein is half-cured at a temperature of 90°C to 100°C for 1 hour to prevent cracking. After that, the clutch hub was heated at 150°C for 1 hour to set the resin contained in the pores.

The time of holding the clutch hub under vcuum depends on the thickness of the resin-impregnated layer. If a vaccum of $1 \times 10^{-3}$ mmHg or more is adopted, too much resin will penetrate into the pores of the clutch hub thereby increasing the difficulty in controlling the resin-impregnated layer.

c. Impregnation under pressure

The sintered clutch hub was immersed and held in a bath of diallyl phtalate resin at a temperature of 15°C to 80°C under a pressure of 2.0 kg/cm$^2$ for a period determined by the desired thickness of the resin-impregnated layer to let the resin penetrate into the pores of the clutch hub. After the pressure was removed, the clutch hub was still held in the resin bath for at least 10 minutes to obtain a stable resin-impregnated layer. Then it was taken out of the resin bath and was heated and was half-cured at a temperature of 90°C to 100°C for 1 hour to prevent cracking. After that, the clutch hub was heated at 150°C for 1 hour to cure completely the resin contained in the pores.

The time of holding the clutch hub under pressure depends upon the desired thickness of the resin-impregnated layer. The higher the pressure applied, the thicker the resin-impregnated layer becomes. However, if the pressure is too high, it will become difficult to maintain the air-tightness of the equipment and, in addition, the effectiveness of the seal layer will be impaired.

According to the present invention, the resins used in the above-mentioned three methods are peferably of a thermosetting type and also have low viscosity at low temperature. Accordingly, any resin including phenol resin, diallyl phtalate resin, epoxy resin, etc. which satisfy the above-mentioned requirements may be used. The conditions of the above-mentioned methods may be adopted for such resins, if the molecular weight of the resins is suitably selected.

.Sealing means removing step

After the resin-impregnated layer was formed as mentioned above, the sealing means was removed. For instance the seal layer covering the surface of the splined bore 5a was removed by grinding.

6.Oil-impregnation step

Oil-impregnation was carried out under the following conditions: Oil used: Either SAE No. 90 gear oil, or No. 145 machine oil was used Impregnation percentage: 100 percent of the pore volume Oil-impregnation method:

Oil was heated to a temperature of 70°C to 90°C to decrease its viscosity and then was poured into a vacuum vessel. The clutch hub was then dipped in the oil contained in the pressure vessel under a vacuum of about $1 \times 10^{-2}$ mmHg to impregnate the oil into the pores of the clutch hub through the surface of the splined bore 5a thereby forming the oil-impregnated portion.

7.Test results

The oil-impregnated sintered clutch hub thus produced was subjected to test for measuring the degree of oil scattering and the friction coefficient between the surfaces of the splined bore 5a and the clutch shaft. The results are as follows:

a. Test for measuring the degree of oil scattering

Test conditions
    Tester used: Spin tester
    Temperature: 100°C
    Rpm: 6,000
    Time: 24 hours
Test result
    Quantity of oil scattered: 0 b. Test for measuring the friction coefficient between the surfaces of the splined bore 5a and the clutch shaft Test conditions
    Torque: 2.0 kg.m
    Repetition rate: 300 cycles/min.
    Stroke: 1 mm
    Lubricant: None
Test result
    Friction coefficient $\mu$ was about 0.08 to 0.1, and remained unchanged up to $10^6$ cycles.

c. Tests of a clutch hub installed on an actual vehicle

In addition to the above-mentioned tests, a clutch hub was installed on an actual vehicle and was subjected to various tests. The results were very favourable and showed that there were no abnormalities including adhesion of oil particles to clutch facings and wear of the surfaces of the splined bore 5a and the clutch shaft due to a shortage of oil contained in the pores of the clutch hub.

The examples mentioned above are concerned with a clutch hub according to the present invention. However, these examples are intended to clearly illustrate the present invention and are not to be construed to limit the scope of the invention. This invention, of course, can be applied to any oil-impregnated sintered product which is to be moved at high speed which comprises an oil-impregnated portion having at least one exposed self-lubricating surface corresponding to the surface of the splined bore 5a of the clutch hub, and a resin-impregnated layer covering at least part of the rest of the surface of the oil-impregnated portion.

Thus, an oil-impregnated sintered product according to this invention can prevent oil impregnated therein from scattering externally therefrom even when it moves at high speed with the consequent result that the function of other parts adjacent to the oil-impregnated sintered product are not deteriorated at all and, in addition, the lubricating ability of the oil-impregnated sintered product can be maintained constant for a long duration.

What is claimed is:

1. A shaped product of a sintered metal powder subject to rotational movement at relatively high speeds about an axis of rotation extending through the product, comprising an oil-impregnated layer which is circumferentially disposed about said axis of rotation; said oil-impregnated layer having an exposed and self-lubricating surface directed toward said axis of rotation and extending therealong; and a resin-impregnated layer contiguous to said oil-impregnated layer and encompassing the same except along the exposed surface thereof; whereby a movement of oil, outward and away from said oil-impregnated layer, due to centrifugal forces caused by the high speed rotation of the product is prevented.

2. A shaped product as defined in claim 1, wherein said exposed surface of said oil-impregnated layer is a wall of a bore extending through the product.

3. A shaped product as defined in claim 1, wherein said resin-impregnated layer is impregnated with a thermosetting resin selected from the group consisting of phenol resins, diallyl phthalate resins, and epoxy resins.

* * * * *